A. R. LAWSHE.
METHOD OF PRODUCING MULTICOLORED PHOTOGRAPHS.
APPLICATION FILED FEB. 5, 1916.
1,248,139. Patented Nov. 27, 1917.
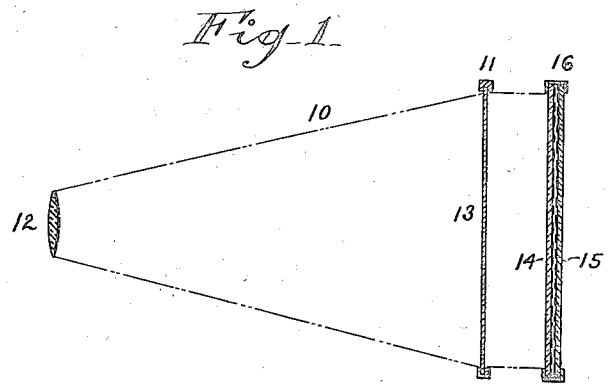
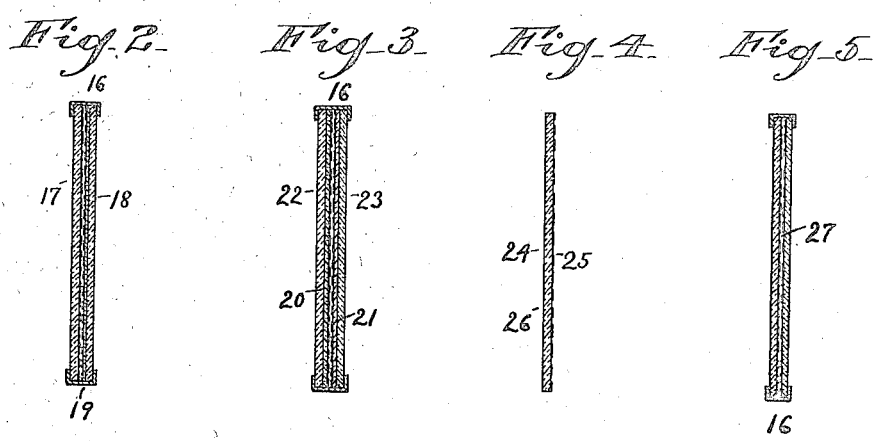
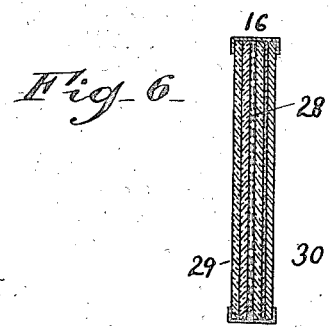

UNITED STATES PATENT OFFICE.

ALLISON R. LAWSHE, OF TRENTON, NEW JERSEY.

METHOD OF PRODUCING MULTICOLORED PHOTOGRAPHS.

1,248,139.      Specification of Letters Patent.    Patented Nov. 27, 1917.

Application filed February 5, 1916. Serial No. 76,254.

*To all whom it may concern:*

Be it known that I, ALLISON R. LAWSHE, a citizen of the United States, residing at Trenton, in the county of Mercer and State of New Jersey, have invented certain new and useful Improvements in the Methods of Producing Multicolor Photographs, of which the following is a specification.

My invention relates to a method for producing multi-color photographs from two negatives in an ordinary plate or film camera by single exposure and use of a single lens; and in such connection my invention relates particularly to that class of color-photography in which monochromatic negative records of the primary colors are obtained on color sensitive plates by exposure in the camera and subsequent development of the latent images, the picture approximating the color of nature to be obtained by superimposing in register suitably colored positives made from the negative records.

In order that my invention may be better understood by those skilled in the general art to which it relates, I will now proceed to describe a mode of carrying out the same found practically efficient.

A panchromatic plate or film and an orthochromatic plate or film are placed with their emulsion sides in contact, in an ordinary plate-holder, in the form of a film-pack or in the form of a roll-film, in the usual position at the back of the camera and an exposure made through a strong yellow or orange screen or filter. If glass plates or cut films are used, they are preferably bound together at one or both sides or ends, with gummed paper, adhesive or by gluing the edges together so as to facilitate handling in the dark room. A panchromatic photographic emulsion is sensitive to red as well as to all other colors. Its sensitiveness however, to green being comparatively weak—while, what is known as an orthochromatic emulsion is sensitive to all colors except red, hence the image of the object it is desired to photograph, after passing through the yellow or orange filter, has its greens and blues recorded on the orthochromatic plate or film and its reds on the panchromatic plate or film. The particular plates and filter I at present prefer to use, are the Wratten and Wainwright panchromatic and the Seed commercial landscape ortho-plates, with the Wratten and Wainwright G or K—3 filter, but I do not confine myself to the use of these plates alone, as other makes or speeds of plates or films, in conjunction with a properly adjusted light filter, may be used with equal advantage. I prefer to place the ortho-plate because of its thinner emulsion in front of the panchromatic plate rather than the reverse of this, for the reason that the reds of the object photographed must pass through this emulsion in order to be recorded upon the panchromatic plate. When employing a yellow filter, as I usually prefer to do, I find it a distinct advantage to dye the ortho-plate before using, for a short time in a red or orange dye, so as to color the emulsion half or nearly so. The purpose of this will readily be understood to those skilled in the photographic art. With the red sensitive plate and the green sensitive plate, emulsion sides together in position at the back of the camera, the latter having its emulsion orange dyed perhaps one-third through with its glass and the undyed side facing the lens of the camera, the image after having the excess of blue light cut off by a yellow filter, will record its greens and blues upon the undyed two-thirds of the ortho-emulsion, while the dyed third will cut out the greens and blues and allow the reds only to be shown for all practical purposes as recorded upon the red sensitive plate. An orange filter will likewise do this, without the need of dyeing the ortho-plate, but less satisfactorily, because an orange filter of sufficient strength to strongly record the reds upon the red-sensitive plate, will cut out the greens too much, for the best results, and will, moreover, allow the blues to act unduly upon the red-sensitive plate. The dye I use for this purpose is a mixture of red and yellow, and I dye the plate for about 30 seconds, in three grains of the dye to five ounces of water.

For the purpose of obviating the use of a filter on the lens, the glass side of the green-sensitive plate may be coated with gelatin dyed yellow or orange.

Development is preferably accomplished in a tank in the usual way. After developing and fixing, the orange dye of the ortho-plate may be removed by soaking in a weak carbonate of soda or other alkaline-solution. Two negatives are thus obtained, one of which is a record of the reds; the other of the greens and blues of the object photographed. From the negative of the reds, a positive is printed on blue carbon tissue, that is, paper coated with gelatin containing a blue pigment that has been sensitized in a sodium, potassium or ammonium bichromate bath and is transferred in water, containing twenty per-cent. (20%) of glycerin to a sheet of celluloid, glass or other similar transparent support, that preferably has been previously coated with a dammar or other resinous varnish to firmly hold the transferred image during development. As the blue carbon tissue, known commercially as tri-chrome blue, prints with considerable rapidity and with more contrast than is desirable, I control this by the addition to the sensitizing bath of a suitable dye of a nonactinic color. For this purpose naphthol B-green and amaranth is very satisfactory, if used in the proportion of five (5) to fifteen (15) grains approximately of the dye to twenty-four (24) grains of ammonium bichromate and one (1) fluid ounce of water containing about 20 drops of ammonia to prevent decomposition or precipitation of the dye. The dye may, of course, be added to the emulsion before spreading upon the paper or other support.

From the negative of the greens and blues a positive is printed on red carbon tissue and transferred to a paper support. Both red and blue positives are now developed in warm water in the usual manner, the red positive is then placed face up in a tray of cold water, after which the blue one may, without injury to the delicate gelatin images, be placed in register upon it (the red image), for examination, when that image which appears too dark may be removed and subjected to further development until the two images, are of equal strength or density. In practice I prefer, at this stage of the procedure, to develop the blue image somewhat further than the red image as will be later explained. The blue image is now to be treated with a strong solution of alum for about five minutes and, after washing approximately 45 seconds in cold water, it is dyed in a yellow dye—preferably in a bath of alizarin yellow in the proportion of one (1) or two (2) grains of the dye to each ounce of water,—the strength of the dye-bath depending upon the tint or hue of green desired, a strong bath giving a yellow-green and a weak bath a bluish-green image. After immersion in the dye-bath it is usually advisable to wipe the face of the image very gently with a tuft of absorbent cotton saturated with the dye solution to remove a scum of alizarin lake that forms over the thicker portions of the image which, if allowed to remain, will prevent the dye from penetrating into and sufficiently coloring those parts. When the image is turned to the shade of green desired, which will be in from two to four minutes,—the film is removed from the dye-bath, rinsed in the alum solution to further fix the dye and,—after washing a short time, the picture may be examined again by superimposing in register the now green image upon the red image in the tray of water, and the latter developed further by immersion in warm water, if further development is needed. This is the reason for not developing the red image too far at the beginning of the operation, for if this were done it would be impossible to obtain a satisfactory picture, because, after dyeing and fixing in alum the former blue, but now green image cannot be further developed.

In order to simplify the process by eliminating the dyeing of the blue image, we may print a red and a green instead of a red and a blue image, this green image to be obtained by using gelatin or other colloid carrying a blue and a yellow pigment so proportioned as to yield a bright grass or emerald green. Analin blue lake or insoluble Prussian blue with alizarin yellow-lake or napthalene yellow lake may be used.

After proceeding as above described the so-obtained green image on its celluloid support may be held up to the light or be placed face up on a sheet of white paper, and those parts of the image corresponding to the different shades of blue, lavender, purple, magenta, violet of the object photographed, if any or all of such colors were present in the original scene or object, brushed over with a weak acid, such as dilute muriatic acid, to decolorize the yellow dye or pigment and leave the blue intact. Now if this so-prepared green-and-blue image be superimposed in register upon the red image we shall have, for example, purple in the combined picture where purple should be, for in this area the red of the red image and the blue of the blue-and-green image will be sufficiently equal and intense to produce purple; we shall have blue where the blue should be, for here the blue area will be more intense and will overcome the corresponding red area; and we shall have magenta where magenta should be, for in this part the red will be sufficiently in excess of the blue to produce magenta. This particular operation, simple though it is, if performed upon a green image that properly balances in intensity of color and degree of contrast with the red image made to go with it, is capable of producing results that equal those obtained by the more complicated processes of three-color photography in which three separate positives are made from three distinct negatives. But it is necessary for the worker to use judgment and some measure of artistic skill. Those parts of the subject photographed which are blue, or which contain the color blue, are noted at the time of taking the picture by observing the object or scene itself, or as imaged upon the ground glass of the camera, and from the memory of such observation, or preferably from notes made at the time of taking the picture, the worker applies the acid where indicated. The strength of the acid is important. An application or two of a solution containing four (4) or five (5) drops of muriatic acid to one ounce of water will produce a greenish-blue; double or triple that strength should be used for lavender, purple and bright blue. Other dyes may be used for dyeing the blue image, for example, naphthol-yellow or fast S yellow, alone or combined, but if these dyes are used a weak alkali must be employed to remove the dye, which, however, is a less satisfactory procedure than the method of decolorizing as above described.

The decolorization of the yellow dye may, if preferred, be deferred until the picture is otherwise finished, as will be hereinafter explained.

Inasmuch as there is invariably some expansion although not always an equal expansion in the length or the width of the red and green images, during the operations of transferring and development, it is desirable to use some sort of a stretching device for the red paper print, in order to secure accurate registration, when mounting the green image upon it. As is my practice having cut the pieces to be printed in the same direction from the roll of tissue to swell the gelatin of the green tissue fully in the transfer water before transferring to the support, while I do not allow the red tissue to fully swell, I transfer it before the tissue is quite limp. In this way, I get the green image somewhat longer or wider, as the case may be, than the red image on the paper support, rather than the reverse of this result. The purpose of this is obvious. The red paper print can be stretched to register with a slightly longer or wider green one, but the green image on its support of glass or celluloid cannot be stretched to register with a longer or wider paper print.

In the accompanying drawings, Figure 1. is a sectional diagrammatic view of a plate or film camera 10 illustrating the relationship between the plate holder 11 and lens 12 thereof and a yellow colored plate 13 interposed between said holder and lens and the same so arranged exemplifying the first step in the carrying out of an efficient method of my invention; the said view in respect to the holder being arranged with an orthochromatic plate 14 and a panchromatic plate 15 with the emulsion sides thereof placed together, and said view also showing the manner of binding and holding together the two plates 16.

Fig. 2, is a diagrammatic sectional view representing another way of carrying into effect the said method, in this instance a sensitive plate or film 17 is placed against a green or blue sensitive plate or film 18 and both bound together with their emulsion sides opposed and with a sheet of glass 19 without or with coating of colored varnish or an emulsion, in the production of a photograph in two or more colors.

Fig. 3, is a similar view, showing a still further way of carrying into effect the said method, representing a red sensitive plate or film 20 and a blue or green sensitive plate or film 21 bound between plain glass plates 22—23.

Fig. 4, is a similar view representing still another way of carrying into effect said method, in which a green or blue sensitive plate 24 or film dyed yellow, red or orange plate is used in conjunction with a red sensitive plate or film 25, in the production of negative color records or a green or blue sensitized plate or film carrying on its unsensitized side 26 a transparent colored varnish or emulsion in conjunction with a resensitive plate.

Fig. 5, is a similar view of still a further way of carrying into effect said method, in this instance three emulsions sensitive to red, green and blue on suitable supports 27, are bound together, with one or more of the emulsion plates or films semi-transparent in the production of negative color records; and Fig. 6, is a similar view, but in this instance, representing the production on paper of a photograph in color by superimposing in register a green or a green-blue image upon a red, or a red image upon a green or green-blue 28 with the two images 29, 30, united and registering with each other.

The green image is to be mounted in register with preferably a solution of gelatin, in water, upon the red image and allowed to dry and when it may be stripped from the celluloid or glass support and, if the yellow dye has not been previously removed from the parts of the picture where blue is required, the print is to be hardened in a formalin bath and a weak acid applied, as already described.

The blue-green image may also be made by printing in clear gelatin and dyeing the developed print in a blue-dye, such as methylene blue, to be followed by alizarin yellow and the yellow decolorized by a weak acid, where blue is wanted.

Transparencies or lantern slides, are preferably made as follows:—The red and the blue gelatin papers are sensitized as for paper pictures and transferred under the sensitizing bath to sheets of celluloid, or other similar transparent material, having a suitably prepared surface to firmly hold the gelatin coating of the paper, which is then allowed to dry. I prefer to prepare the surface of the celluloid through grinding with an abrasive, by treatment with a solvent of the celluloid, such as alcohol, or by varnishing with a solution of caoutchouc or gutta-percha. The same end may be obtained without previous preparation of the celluloid by using an alcoholic sensitizing bath, that is, one containing 25% of denatured alcohol, will answer the purpose. The sensitized film is printed through the celluloid supports and developed as usual. After development the red print is placed face up, upon a sheet of glass and the blue one, after dyeing, and fixing in an alum solution, may be examined by placing in register over the red on the opposite side of the sheet of glass, or by means of an examining frame, which may be a sheet of thin glass or celluloid provided with a wooden or metal frame and a handle, and the alizarin decolorized when desired, as already explained. Very attractive pictures to be viewed by reflected light, as paper photographs are viewed, may be made by printing the images sufficiently thin to show properly when bound between a cover-glass and a white cardboard backing. It will be apparent that suitably prepared sheets of celluloid or other similar material, such as thin glass, can be coated with the red and blue gelatin emulsions, in which case the use of the emulsion coated paper as above, would be obviated. The merits of this particular method are that absolute registration is made possible with but little effort on the part of the operator, and a color photograph produced by simple manipulation, that any amateur in photography can grasp.

A modification of the foregoing method of obtaining the colors, blue and green in the one image, is to coat paper or celluloid with a gelatin or other colloidal emulsion, containing a green pigment, composed of insoluble Prussian blue and alizarin yellow lake, the latter formed by precipitation from the dye by means of barium chlorid or other suitable reagent. This emulsion is to be sensitized in a neutral bichromate bath. The subsequent treatment is the same as above described, for blue carbon tissue, except that the dyeing is in this case obviated and the further advantage that yellow may be added to the image by brushing over those parts where the yellow is desired, with silver nitrate, which will remove the blue pigment and allow the yellow to remain.

In addition to the above described method of obtaining the negative color-records, I can make simultaneously three negative color-records by using together, a red-sensitive or panchromatic plate, a green sensitive or orthochromatic film, and a blue sensitive plate or film, the latter not orthochromatic and with a semi-transparent emulsion. These are preferably bound together. The color-sensitive pack is to be placed in the plate-holder with the blue-sensitive side toward the lens and exposure made in the usual way through a suitable filter. The blue-sensitive emulsion will record the blues, but being insensitive to other colors it will not be affected by them. The green sensitive emulsion will record both the greens and the blues, but not the reds. The red-sensitive plate will record only the reds, because the orange dye in the green-sensitive film will cut off the blues and greens. Yellow will of course, be recorded upon both the green and red-sensitive emulsions for yellow is composed of red and green. The filter may be dispensed with by dyeing the emulsion of the blue-sensitive plate, or by spreading upon its uncoated side a film of suitably dyed gelatin. Of course, the green-sensitive film or plate may be placed nearest the lens of the camera and a blue sensitive film used between it and the red-sensitive plate, but in this case the green-sensitive emulsion must be semi-transparent, as well as, or instead of, the blue sensitive film.

After development, from the so-obtained negative of the reds, a blue positive is made as above described. From the negative of the greens and blues a red positive is made, and from the negative of the blues a yellow positive, the latter by dyeing a colorless gelatin or other colloidal image in a yellow dye, such as alizarin yellow or by using a gelatin-coated paper or celluloid containing a yellow pigment.

Paper pictures may be made by this process by transferring either the red or the yellow print to paper and mounting the two remaining images upon it. Transparencies are preferably, made upon celluloid and may be examined during the progress of development by means of an examining frame. The yellow image will preferably be finished first and placed wet upon the inside of the frame. The frame is then closed and the three images examined, when desired by placing the red and blue images upon the outside of the frame in register over the yellow image. The red and blue images are developed until upon examination, the picture appears in its natural colors.

The hereinbefore described method may be employed to produce motion pictures in color, by first, making the negatives of the reds in a red sensitive, panchromatic film, and simultaneously the negatives of the greens and blues in a green sensitive orthochromatic film, one film to be placed in front of and in juxtaposition to the other film, using a suitable color filter or color screen and preferably dyeing the ortho-film in an orange dye as already described; and by second making the negatives of the reds and the negatives of the greens and blues simultaneously with a cinematographic camera having a suitable lens and using an orange dyed ortho-film as hereinbefore explained or an orange filter. Positives are then made for being projected from the thus obtained negatives, as follows:—

First: From the negatives of the greens and blues are made red positives and from the negatives of the reds are made green positives on gelatin-coated celluloid as already explained. Form the blues and all color containing blue, as lavender, purple, magenta, by brushing those parts of the green image where those colors are desired with a weak acid, as already described and superimposing in register and uniting the celluloid sides together of the two films by passing through a celluloid solvent, such as amyl-acetate, followed by pressure, as by passing between rubber rollers. The film is then to be projected in the usual manner.

Second: The other method is to make monochromatic positives in the usual way and to project through a twin lens projector, the lens projecting the positive of the reds to be provided with a green filter or screen and the lens-projecting the positive of the greens to be provided with a red screen and the two images of course to be superimposed in register and projected simultaneously on the screen. Instead of using the red and green screens or filters, one film may be dyed red and the other green and equally good results be derived.

Having thus described the nature and objects of my invention, what I claim as new and desire to secure by Letters Patent is:—

1. The method of producing a multi-color photograph, which consists in exposing in a plate or film camera through a light filter two color sensitive plates or films to derive by development of the latent images of such plates or films monochromatic negative records of the three primary colors of the object photographed, then printing and developing from said negatives respectively, two positives of different colors, which, superimposed in register, approximate the colors or tints of said object, one of said printed and developed positives representing substantially the areas of the blue and green colors or tints of the object photographed and the color area of one of said colors or tints being derived by decolorizing one of the color constituents of the other color or tint.

2. The method of producing a multi-color photograph, which consists in exposing in a plate or film camera by a single exposure through a light filter two color sensitive plates or films to derive by development of the latent images of such plates or films monochromatic negative records of the three primary colors of the object photographed, then printing and developing from said negatives respectively, two positives of different colors, which superimposed in register, approximate the colors or tints of said object, one of said printed and developed positives representing substantially the area of the red color or tint and the other representing substantially the areas of the blue and green colors or tints of the object photographed and the color area of one of said colors or tints being derived by decolorizing certain of the color constituents of the other color or tint.

3. The method of producing a multi-color photograph, which consists in exposing in a plate or film camera by a single exposure through a light filter two color sensitive plates or films to derive by development of the latent images of such plates or films, monochromatic negative records of the three primary colors of the object photographed, then printing and developing from said negatives respectively, two positives of different colors which, superimposed in register, approximate the colors or tints of said object, one of said printed and developed positives representing subtantially the area of the red color or tint, and the other representing substantially the areas of the blue and green colors or tints of the object photographed and the blue area being derived by decolorizing one of the color constituents of the green.

4. The method of producing a multi-color photograph, which consists in exposing in a plate or film camera by a single exposure through a light filter two color sensitive plates or films bound together with the emulsion sides facing each other, to derive by development of the latent images of such plates or films, monochromatic negative records of the three primary colors of the object photographed, then printing and developing from said negatives respectively, a red and a blue colloidal positive, the blue positive being dyed in a yellow dye, and finally decolorizing the dye in the parts of the image corresponding to blue or the colors or tints containing blue of the object photographed.

5. The method of producing a multi-color photograph, which consists in exposing in a plate or film camera by a single exposure through a light filter two color sensitive plates or films bound together with the emulsion sides facing each other, to derive by development of the latent images of such plates or films, monochromatic negative records of the three primary colors of the object photographed, then printing and developing from said negatives respectively, a red and a green colloidal positive and finally decolorizing one of the pigments in certain areas and retaining the other.

6. The method of producing a multicolor photograph, which consists in exposing in a plate or film camera by a single exposure through a light filter two color sensitive plates or films bound together with the emulsion sides facing each other, to derive by development of the latent images of such plates or films, monochromatic negative records of the three primary colors of the object photographed, then printing and developing from said negatives respectively, a red and a blue colloidal positive, the blue positive after development being dyed in a yellow dye, and finally decolorizing the dye in the parts of the image corresponding to blue or the colors or tints containing blue of the object photographed, the blue positive having been sensitized in a bath containing a dye of a non-actinic color to control the printing speed and degree of contrast of the printed and developed image.

7. The method of producing a multicolor photograph, which consists in exposing in a plate or film camera through a light filter two color sensitive plates or films to derive by development of the latent images of such plates or films monochromatic negative records of the three primary colors of the object photographed, then printing and developing from said negatives respectively, two positives of different colors or tints which, superimposed in register, approximate the colors or tints of said object and finally decolorizing the image in parts of one of said printed and developed positives of the object photographed.

8. The method of producing multi-color photographs, which consists in exposing in a plate or film camera through a light filter two color sensitive plates or films to derive by development of the latent images of such plates or films monochromatic negative records of the three primary colors of the object photographed, then printing and developing from said negatives respectively, two positives of different colors or tints which, superimposed in register, approximate the colors or tints of said object and finally decolorizing the image in parts of one of said printed and developed positives of the object photographed and the emulsion of said color positive containing a dye of a non-actinic color to control the printing speed and degree of contrast of the printed and developed image.

9. The method of producing a multi-color photograph, which consists in exposing in a plate or film camera, by a single exposure two color sensitive plates or films with the emulsion sides facing each other, the back of the plate or film nearest the lens of the camera carrying a light-filtering medium to derive by development of such plates or films negative records of the primary colors of the object photographed, then printing and developing simultaneously or successively from said negatives respectively, two positives, one to represent substantially the red color or tint and the other to represent substantially the blue, green and yellow colors or tints of the object photographed, the color area of one or more of said colors or tints being derived by partly or entirely decolorizing one of the color constituents of the other color or tint and said positives being in registry and having a suitable reflecting base.

10. The method of producing a multicolor photograph, which consists in photographically preparing from color-selective negatives two colloid images, one of said images representing substantially the red color or tint and the other image representing substantially the blue, green and yellow colors or tints of the scene or object as represented by the color selective negatives, the color area of one or more of said colors or tints being derived by decolorizing one of the color constituents of the other color or tint and said images being arranged in registry and having a suitable reflecting base.

11. The method of producing a multicolor photograph, which consists in exposing simultaneously to the same light image, through a light filter, two color sensitive plates or films to derive by development of the latent images of such plates or films negative records of the primary colors of the said light image, then photographically preparing from said negatives respectively, two colloid images of different colors, in register, to approximate the colors or tints of said light image, one of said colloid images substantially representing the areas of the blue, green and yellow colors or tints of the light image, and the color area of one or more of such colors or tints being derived by partly or entirely removing one of the color constituents of the other color or tint.

12. The method of producing a multicolor photograph, which consists in exposing simultaneously to the same light image, through a light filter, two color sensitive plates or films to derive by development of the latent images of such plates or films negative records of the primary colors of the said light image, then photographically preparing from said negatives respectively, two colloid images of different colors, in register, to approximate the colors or tints of said light image, the color of one of said colloid images being a compound color, comprising a plurality of dyes or pigments, and substantially representing, when finished, the area of the blue, green and yellow colors or tints of the light image, the color area of one or more of such colors or tints being derived by partly or entirely removing one of the color components of the compound color, and said colloid images having a suitable reflecting base.

In witness whereof, I have hereunto set my signature in the presence of two subscribing witnesses.

ALLISON R. LAWSHE.

Witnesses:
ALICE M. SCHAIBLE,
OWEN W. KITE.